United States Patent
Moussaoui et al.

(10) Patent No.: US 12,014,857 B2
(45) Date of Patent: Jun. 18, 2024

(54) WIRELESS CHARGING SYSTEM WITH A SWITCHABLE MAGNETIC CORE

(71) Applicant: Apple Inc., Cupertino, CA (US)

(72) Inventors: Zaki Moussaoui, San Carlos, CA (US); Zelin Xu, San Jose, CA (US); Matthew J. Chabalko, Santa Cruz, CA (US); Nan Liu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 577 days.

(21) Appl. No.: 17/179,603

(22) Filed: Feb. 19, 2021

(65) Prior Publication Data

US 2021/0398733 A1     Dec. 23, 2021

Related U.S. Application Data

(60) Provisional application No. 63/041,729, filed on Jun. 19, 2020.

(51) Int. Cl.
| | |
|---|---|
| *H02J 7/00* | (2006.01) |
| *H01F 27/24* | (2006.01) |
| *H01F 38/14* | (2006.01) |
| *H02J 7/02* | (2016.01) |
| *H02J 50/12* | (2016.01) |
| *H02J 50/90* | (2016.01) |

(52) U.S. Cl.
CPC ............ *H01F 27/24* (2013.01); *H01F 38/14* (2013.01); *H02J 7/02* (2013.01); *H02J 50/12* (2016.02); *H02J 50/90* (2016.02)

(58) Field of Classification Search
USPC .................. 320/106, 107, 108, 109, 110, 112
See application file for complete search history.

(56) References Cited

U.S. PATENT DOCUMENTS

| | | | |
|---|---|---|---|
| 6,677,756 B2 | 1/2004 | Fanini et al. | |
| 9,509,177 B2 | 11/2016 | Nahidipour | |
| 9,672,976 B2 | 6/2017 | Levo et al. | |
| 10,056,786 B2 | 8/2018 | Walley et al. | |

(Continued)

FOREIGN PATENT DOCUMENTS

| | | | |
|---|---|---|---|
| AU | 2019101615 A4 | | 1/2020 |
| CN | 104011814 | * | 8/2014 |

(Continued)

*Primary Examiner* — Brian Ngo
(74) *Attorney, Agent, or Firm* — Treyz Law Group, P.C.; Joseph F. Guihan

(57) ABSTRACT

An electronic device in a wireless power system may be operable with a removable accessory such as a case. The device may convey wireless power to, from, or through the case while the device is coupled to the case. The device may have coplanar power transmitting and power receiving coils. The removable accessory may have an embedded switchable ferrimagnetic core and a coil that overlaps the switchable ferrimagnetic core. The switchable ferrimagnetic core may be operable in a first state where the switchable ferrimagnetic core is unsaturated. The switchable ferrimagnetic core may be operable in a second state where the switchable ferrimagnetic core is saturated by a magnetic field from a permanent magnet in a wireless power transmitting device. In the second state, the switchable ferrimagnetic core may have a lower magnetic permeability and higher magnetic reluctance than in the first state.

19 Claims, 10 Drawing Sheets

(56) References Cited

U.S. PATENT DOCUMENTS

| | | |
|---|---|---|
| 10,083,792 B2 | 9/2018 | Werner et al. |
| 10,147,991 B1 | 12/2018 | Wu et al. |
| 10,229,782 B2 | 3/2019 | Muratov |
| 10,277,043 B2 | 4/2019 | Graham et al. |
| 10,522,914 B2 | 12/2019 | Hong et al. |
| 2014/0125143 A1 | 5/2014 | Yamada et al. |
| 2015/0115727 A1* | 4/2015 | Carobolante ........ H04B 5/0075 307/104 |
| 2016/0344224 A1 | 11/2016 | Hong |
| 2017/0149474 A1 | 5/2017 | Kim |
| 2017/0170678 A1 | 6/2017 | Uhm |
| 2018/0174745 A1* | 6/2018 | Percebon ................ H01F 38/14 |
| 2018/0314349 A1 | 11/2018 | Jiang et al. |
| 2019/0123588 A1 | 4/2019 | Kim et al. |
| 2019/0207425 A1 | 7/2019 | Hansen |
| 2019/0260235 A1 | 8/2019 | Hemphill et al. |
| 2019/0260410 A1 | 8/2019 | Ashworth et al. |
| 2019/0311848 A1 | 10/2019 | Chen et al. |
| 2019/0356165 A1 | 11/2019 | Jacobson et al. |
| 2020/0227935 A1 | 7/2020 | Mehta et al. |
| 2021/0313836 A1 | 10/2021 | Yamaguchi et al. |

FOREIGN PATENT DOCUMENTS

| | | |
|---|---|---|
| CN | 105101767 | * 11/2015 |
| CN | 206077082 U | 4/2017 |
| CN | 104952605 | * 5/2018 |
| CN | 108711946 A | 10/2018 |
| CN | 110098662 A | 8/2019 |
| WO | 2018082769 A1 | 5/2018 |

* cited by examiner

WIRELESS CHARGING SYSTEM WITH A SWITCHABLE MAGNETIC CORE

This application claims priority to U.S. provisional patent application No. 63/041,729 filed Jun. 19, 2020, which is hereby incorporated by reference herein in its entirety.

FIELD

This relates generally to power systems, and, more particularly, to wireless power systems for charging electronic devices.

BACKGROUND

In a wireless charging system, a wireless power transmitting device such as a charging mat wirelessly transmits power to a wireless power receiving device such as a portable electronic device. The wireless power receiving device has a coil and rectifier circuitry. The coil receives alternating-current wireless power signals from the wireless charging mat. The rectifier circuitry converts the received signals into direct-current power.

SUMMARY

A wireless power system may include one or more wireless power transmitting devices, one or more wireless power receiving devices, and one or more wireless power transmitting and receiving devices. The wireless power transmitting device may include a coil and wireless power transmitting circuitry coupled to the coil. The wireless power transmitting circuitry may be configured to transmit wireless power signals with the coil. The wireless power receiving device may include a coil that is configured to receive wireless power signals from the wireless power transmitting device and rectifier circuitry that is configured to convert the wireless power signals to direct current power. The wireless power transmitting and receiving device may include at least one coil and both wireless power transmitting circuitry and wireless power receiving circuitry.

A device in a wireless power system may be operable with a removable accessory such as a case. The device may transmit or receive wireless power through the case while the electronic device is coupled to the case. The device may also transmit wireless power to the case or receive wireless power from the case while the electronic device is coupled to the case. The case may have a folio shape with a front cover portion that covers the display of the electronic device.

The removable accessory may have an embedded switchable ferrimagnetic core and a coil that overlaps the switchable ferrimagnetic core. In one scenario, the removable accessory may be coupled to the device without being coupled to a separate wireless power transmitting device (such as a wireless charging mat). In this scenario, the switchable ferrimagnetic core may be operable in a first state where the switchable ferrimagnetic core is unsaturated and has a high magnetic permeability and low magnetic reluctance. In the first state, the switchable ferrimagnetic core may direct received magnetic flux from the device towards the coil that is embedded in the removable accessory.

When the removable accessory is both coupled to the device and placed on a wireless charging mat, the wireless charging mat may transfer wireless power through the removable accessory to the device. In this scenario, the switchable ferrimagnetic core may be operable in a second state where the switchable ferrimagnetic core is saturated by a magnetic field from a permanent magnet in the wireless charging mat. In the second state, the switchable ferrimagnetic core may have a lower magnetic permeability and higher magnetic reluctance than in the first state. The switchable ferrimagnetic core may have a saturation flux density that is selected such that the switchable ferrimagnetic core has different magnetic reluctances depending on the presence of the wireless power transmitting device and its permanent magnet.

DETAILED DESCRIPTION

A wireless power system may include one or more electronic devices that transmit wireless power, one or more electronic devices that receive wireless power, and one or more electronic devices that both transmit and receive wireless power. The wireless power transmitting device may be a wireless charging mat or wireless charging puck, as examples. The wireless power receiving device may be a device such as a wrist watch, cellular telephone, tablet computer, laptop computer, or other electronic equipment, as examples. The wireless power transmitting and receiving device may be an electronic device case (e.g., a case for a cellular telephone) or other type of electronic device. The wireless power transmitting device may wirelessly transmit power to a wireless power receiving device. The wireless power receiving device uses power from the wireless power transmitting device for powering the device and for charging an internal battery.

Wireless power is transmitted from the wireless power transmitting device to the wireless power receiving device using one or more wireless power transmitting coils. The wireless power receiving device has one or more wireless power receiving coils coupled to rectifier circuitry that converts received wireless power signals into direct-current power.

Figure 1:
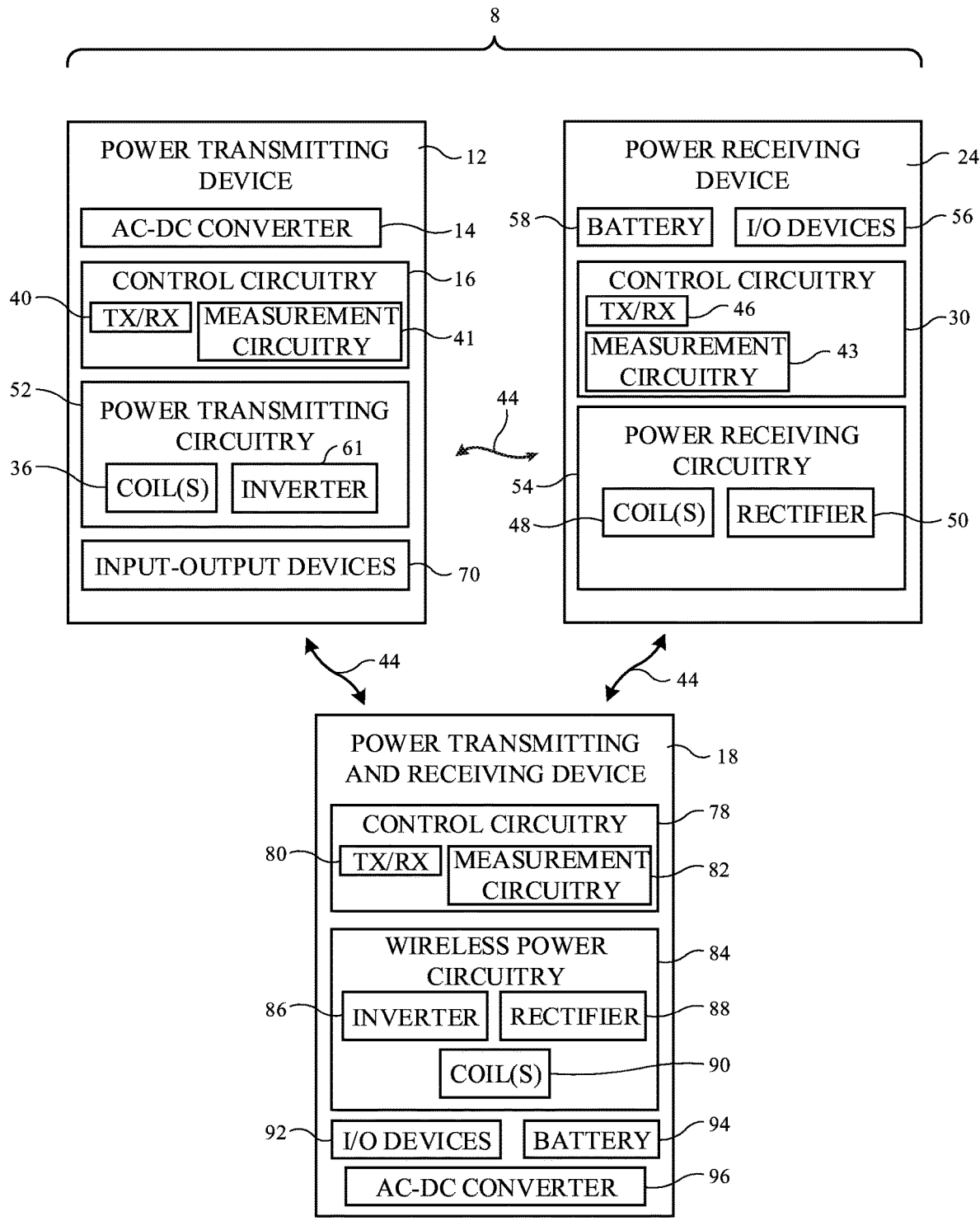
FIG. 1 is a schematic diagram of an illustrative wireless power system in accordance with an embodiment.

An illustrative wireless power system (wireless charging system) is shown in FIG. 1. As shown in FIG. 1, wireless power system 8 may include one or more wireless power transmitting devices such as wireless power transmitting device 12, one or more wireless power receiving devices such as wireless power receiving device 24, and one or more electronic devices capable of both transmitting and receiving wireless power such as wireless power transmitting and receiving device 18. It should be understood that one or more of each type of device may be present in the wireless power system at any given time, with devices being added and removed from the system in a fluid manner. The function of power transmitting and receiving 18 may change depending upon the arrangement of the system at a given time. A power transmitting and receiving device may only transmit power in some scenarios, may only receive power in some scenarios, and may both transmit and receive power in some scenarios. A power transmitting device 12 may transmit power directly to a power receiving device 24 in some scenarios. In other scenarios, power transmitting device 12 may transmit power to a power transmitting and receiving device 18, which then transmits the power to power receiving device 24. The functionality of each device and inductive coupling between each device within the system may be updated as devices are added to and removed from the system.

Wireless power transmitting device 12 includes control circuitry 16. Wireless power receiving device 24 includes control circuitry 30. Wireless power transmitting and receiving device 18 includes control circuitry 78. Control circuitry in system 8 such as control circuitry 16, control circuitry 30, and control circuitry 78 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12, 18, and 24. For example, the processing circuitry may be used in selecting coils, determining power transmission levels, processing sensor data and other data to detect foreign objects and perform other tasks, processing user input, handling negotiations between devices 12, 18, and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16, 30, and/or 78. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a wireless charging mat or puck are sometimes described herein as an example.

Power receiving device 24 may be a portable electronic device such as a wrist watch, a cellular telephone, a laptop computer, a tablet computer, an accessory such as an earbud, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. For simplicity, an example is described herein of power transmitting device 12 transmitting wireless power to power receiving device 24. However, it should be understood that a power transmitting and receiving device 18 may substitute for one or both of the power transmitting device and the power receiving device during wireless power transfer operations.

Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coil(s) 36. These coil drive signals cause coil(s) 36 to transmit wireless power. Coils 36 may be arranged in a planar coil array or may be arranged to form a cluster of coils. In some arrangements, device 12 (e.g., a charging mat, puck, etc.) may have only a single coil. In other arrangements, a wireless charging device may have multiple coils (e.g., two or more coils, 5-10 coils, at least 10 coils, 10-30 coils, fewer than 35 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. In other words, one or more of coils 36 is inductively coupled to one or more of coils 48. Device 24 may have a single coil 48, at least two coils 48, at least three coils 48, at least four coils 48, or other suitable number of coils 48.

When the alternating-current electromagnetic fields (sometimes referred to as magnetic flux) are received by coil(s) 48 (e.g., when magnetic flux passes through coils 48), corresponding alternating-current currents are induced in coil(s) 48. The AC signals that are used in transmitting wireless power may have any suitable frequency (e.g., 100-250 kHz, etc.). Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56. Input-output devices 56 may include input devices for gathering user input and/or making environmental measurements and may include output devices for providing a user with output. As an example, input-output devices 56 may include a display for creating visual output, a speaker for presenting output as audio signals, light-emitting diode status indicator lights and other light-emitting components for emitting light that provides a user with status information and/or other information, haptic devices for generating vibrations and other haptic output, and/or other output devices. Input-output devices 56 may also include sensors for gathering input from a user and/or for making measurements of the surroundings of system 8. Illustrative sensors that may be included in input-output devices 56 include three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible cameras with respective infrared and/or visible digital image sensors and/or ultraviolet light cameras), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors such as infrared proximity sensors, other proximity sensors, force sensors, sensors such as contact sensors based on switches, gas sensors, pressure sensors, moisture sensors, magnetic sensors, audio sensors (microphones), ambient light sensors, optical sensors for making spectral measurements and other measurements on target objects (e.g., by emitting light and measuring reflected light), microphones for gathering voice commands and other audio input, distance sensors, motion, position, and/or orientation sensors that are configured to gather information on motion, position, and/or orientation (e.g., accelerometers, gyroscopes, compasses, and/or inertial measurement units that include all of these sensors or a subset of one or two of these sensors), sensors such as buttons that detect button press input, joysticks with sensors that detect joystick movement, keyboards, and/or other sensors. Device 12 may optionally have one or more input-output devices 70 (e.g., input devices and/or output devices of the type described in connection with input-output devices 56). Device 18 may optionally have one or more input-output devices 92 (e.g., input devices and/or output devices of the type described in connection with input-output devices 56).

Device 12, device 18, and/or device 24 may communicate wirelessly using in-band or out-of-band communications. Device 12 may, for example, have wireless transceiver circuitry 40 that wirelessly transmits out-of-band signals (e.g., to device 18 or device 24) using an antenna. Wireless transceiver circuitry 40 may be used to wirelessly receive out-of-band signals from device 18 or 24 using the antenna. Device 24 may have wireless transceiver circuitry 46 that transmits out-of-band signals. Receiver circuitry in wireless transceiver 46 may use an antenna to receive out-of-band signals. Device 18 may have wireless transceiver circuitry 80 that transmits out-of-band signals. Receiver circuitry in wireless transceiver 80 may use an antenna to receive out-of-band signals. Wireless transceiver circuitry 40, 46, and 80 may also be used for in-band transmissions between devices 12, 24, and 18 using coils 36, 48, and 90.

Frequency-shift keying (FSK) and/or amplitude-shift keying (ASK) may be used to convey in-band data between devices 12, 18, and 24. Power may be conveyed wirelessly during these FSK and ASK transmissions.

It is desirable for power transmitting device 12, power transmitting and receiving device 18, and power receiving device 24 to be able to communicate information such as received power, battery states of charge, and so forth, to control wireless power transfer. However, this process need not involve the transmission of personally identifiable information. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Control circuitry 16 has external object measurement circuitry 41 that may be used to detect external objects on the charging surface of the housing of device 12 (e.g., on the top of a charging mat or, if desired, to detect objects adjacent to the coupling surface of a charging puck). The charging surface may be formed by a planer outer surface of the upper housing wall of device 12 or may have other shapes (e.g., concave or convex shapes, etc.). In arrangements in which device 12 forms a charging puck, the charging puck may have a surface shape that mates with the shape of device 24. A puck or other device 12 may, if desired, have magnets (sometimes referred to as magnetic alignment structures) that removably attach device 12 to device 24, in the process aligning coil 48 with coil 36 for efficient wireless charging.

Circuitry 41 can detect foreign objects such as coils, paper clips, and other metallic objects and can detect the presence of wireless power receiving devices 24 (e.g., circuitry 41 can detect the presence of one or more coils 48 and/or magnetic core material associated with coils 48). During object detection and characterization operations, external object (foreign object) measurement circuitry 41 can be used to make measurements on coil(s) 36 such as Q-factor measurements, resonant frequency measurements, and/or inductance measurements that can indicate whether coil 48 is present and/or whether foreign objects such as coins or paperclips are present. Measurement circuitry can also be used to make sensor measurements using a capacitive sensor, can be used to make temperature measurements, and/or can otherwise be used in gathering information indicative of whether a foreign object or other external object (e.g., device 18 or 24) is present on device 12.

In some configurations, the control circuitry of device 12 (e.g., circuitry 41 and/or other control circuitry 16) can implement a power counting foreign object detection scheme. With this approach, device 12 receives information from device 24 (e.g., via in-band communications) indicating the amount of power that device 24 is wirelessly receiving (e.g., 4.5 W). Device 12 knows how much power (e.g., 5.0 W) is being transmitted (e.g., because device 12 knows the magnitude of the signal being used to drive coil 36 from inverter 61). By comparing the transmitted power (e.g., 5.0 W) to the received power (e.g., 4.5 W), device 12 can determine whether wireless power is being dissipated due to eddy currents flowing in a foreign object. If the dissipated power (e.g., 0.5 W in this example) is more than a predetermined threshold amount or if the efficiency of the wireless power transfer process is lower than expected, device 12 can conclude that a foreign object is present. Power counting techniques such as these may be used in conjunction with capacitive sensing foreign object detection techniques and/or other external object measurement operations performed using circuitry 41.

In some embodiments, measurement circuitry 41 of control circuitry 16 contains signal generator circuitry (e.g., oscillator circuitry for generating AC probe signals at one or more probe frequencies, a pulse generator that can create impulses so that impulse responses can be measured) and/or uses the transmission of wireless power signals from device 12 to energize the coils in system 8. Circuitry 41 may also include circuits (e.g., analog-to-digital converter circuits, filters, analog combiners, digital processing circuitry, etc.) to measure the response of system 8.

Power transmitting and receiving device 18 may be a wireless charging mat or puck that is coupled to a power adapter or other equipment by a cable, may be equipment that has been incorporated into furniture, a vehicle, or other system, may be a removable battery case, may be a portable electronic device such as a wrist watch, a cellular telephone, a laptop computer, a tablet computer, an accessory such as an earbud, or other electronic equipment. Power transmitting and receiving device 18 is capable of both transmitting and receiving wireless power. Power transmitting and receiving device 18 therefore may include power transmitting components, similar to power transmitting device 12. Power transmitting and receiving device 18 may also include power receiving components, similar to power receiving device 24.

Power transmitting and receiving device 18 may have an alternating-current (AC) to direct-current (DC) power converter such as AC-DC power converter 96 for converting AC power from a wall outlet or other power source into DC power. DC power may be used to power control circuitry 78. Control circuitry 78 includes wireless transceiver circuitry 80 for in-band communications (using coils 90) and out-of-band communications (using an antenna). Control circuitry 78 may also optionally include measurement circuitry 82 (e.g., measurement circuitry of the type described in connection with measurement circuitry 41).

Wireless power circuitry 84 in device 18 may include both an inverter 86 and a rectifier 88. Inverter circuitry 86 (e.g., formed from transistors) may be turned on and off based on control signals provided by control circuitry 78 to create AC current signals through one or more coils such as coil(s) 90. These coil drive signals cause coil(s) 90 to transmit wireless power. Coils 90 may be arranged in a planar coil array or may be arranged to form a cluster of coils. In some arrangements, device 18 may have only a single coil. In other arrangements, device 18 may have multiple coils (e.g., two or more coils, 5-10 coils, at least 10 coils, 10-30 coils, fewer than 35 coils, fewer than 25 coils, or other suitable number of coils).

As the AC currents pass through one or more coils 90, alternating-current electromagnetic (e.g., magnetic) fields (wireless power signals 44) are produced that are received by one or more corresponding receiver coils such as coil(s) 48 in power receiving device 24. In other words, one or more of coils 90 may be inductively coupled to one or more of coils 48.

Power transmitting and receiving device 18 may also receive wireless power (e.g., from power transmitting device 12). Coil(s) 90 may receive alternating-current electromagnetic fields from transmitting coils 36, resulting in corresponding alternating-current currents in coil(s) 90. Rectifier circuitry such as rectifier circuitry 88, which contains rectifying components such as synchronous rectification metal-oxide-semiconductor transistors arranged in a bridge network, converts received AC signals (received alternating-current signals associated with electromagnetic signals 44) from one or more coils 90 into DC voltage signals for powering device 18. The DC voltage produced by rectifier circuitry 88 can be used in charging a battery such as battery 94 and can be used in powering other components in device 18.

The depiction of alternating-electromagnetic fields between each type of device in FIG. 1 is merely illustrative (to show the type of inductive coupling that is possible). In practice, alternating-electromagnetic fields will only be conveyed between select devices within the system. For example, transmitting device 12 may transmit power to device 24 and device 18 (while device 18 does not separately transmit power to device 18). In another example, transmitting device 12 transmits power to device 18, which transmits power to device 24 (without direct exchange of power from device 12 to device 24).

In some applications, power transmitting and receiving device 18 only transmits wireless power (e.g., using inverter 86 and coil(s) 90). In some applications, power transmitting and receiving device 18 only receives wireless power (e.g., using rectifier 88 and coil(s) 90). In some applications, power transmitting and receiving device simultaneously receives and transmits wireless power. When simultaneously receiving and transmitting wireless power, device 18 may optionally perform both the power transmitting and power receiving operations associated with inverter 86 and rectifier 88 (e.g., device 18 uses the rectifier to charge the battery and operate the device and independently uses the inverter to transmit a desired amount of power). Alternatively, device 18 may relay received power signals without rectifying the power. Device 18 may include only one coil that is used for both wireless power transmission and wireless power reception. Alternatively, device 18 may have at least one dedicated wireless power transmitting coil and at least one dedicated wireless power receiving coil. Device 18 may have multiple coils that are all capable of both wireless power transmission and wireless power reception. Different coils in device 18 may optionally be shorted together in different modes of operation.

Figure 2:
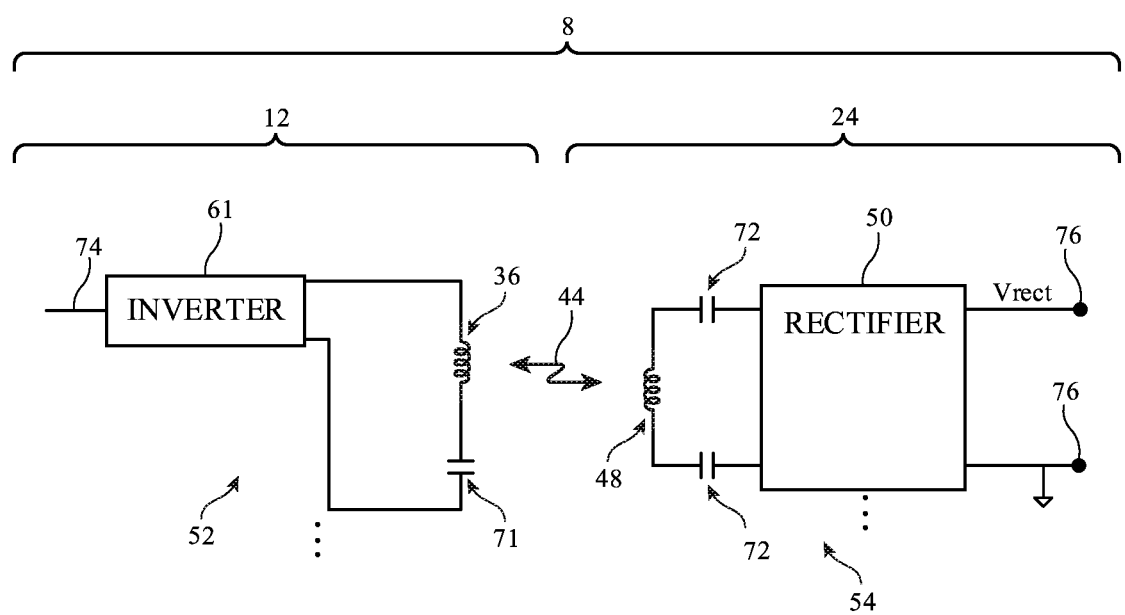
FIG. 2 is a circuit diagram of illustrative wireless power transmitting and receiving circuitry in accordance with an embodiment.

FIG. 2 is a circuit diagram of illustrative wireless charging circuitry for system 8. Wireless charging circuitry of a power transmitting device 12 and a power receiving device 24 is shown. However, it should be understood that device 18 may have the corresponding components for both power transmission and power reception and may be used in place of either device 12 and/or device 24 if desired. As shown in FIG. 2, circuitry 52 may include inverter circuitry such as one or more inverters 61 or other drive circuitry that produces wireless power signals that are transmitted through an output circuit that includes one or more coils 36 and capacitors such as capacitor 71. In some embodiments, device 12 may include multiple individually controlled inverters 61, each of which supplies drive signals to a respective coil 36. In other embodiments, an inverter 61 is shared between multiple coils 36 using switching circuitry.

During operation, control signals for inverter(s) 61 are provided by control circuitry 16 at control input 74. A single inverter 61 and single coil 36 is shown in the example of FIG. 2, but multiple inverters 61 and multiple coils 36 may be used, if desired. In a multiple coil configuration, switching circuitry (e.g., multiplexer circuitry) can be used to couple a single inverter 61 to multiple coils 36 and/or each coil 36 may be coupled to a respective inverter 61. During wireless power transmission operations, transistors in one or more selected inverters 61 are driven by AC control signals from control circuitry 16. The relative phase between the inverters can be adjusted dynamically. For example, a pair of inverters 61 may produce output signals in phase or out of phase (e.g., 180 degrees out of phase).

The application of drive signals using inverter(s) 61 (e.g., transistors or other switches in circuitry 52) causes the output circuits formed from selected coils 36 and capacitors 71 to produce alternating-current electromagnetic fields (signals 44) that are received by wireless power receiving circuitry 54 using a wireless power receiving circuit formed from one or more coils 48 and one or more capacitors 72 in device 24.

If desired, the relative phase between driven coils 36 (e.g., the phase of one of coils 36 that is being driven relative to another adjacent one of coils 36 that is being driven) may be adjusted by control circuitry 16 to help enhance wireless power transfer between device 12 and device 24. Rectifier circuitry 50 is coupled to one or more coils 48 and converts received power from AC to DC and supplies a corresponding direct current output voltage Vrect across rectifier output terminals 76 for powering load circuitry in device 24 (e.g., for charging battery 58, for powering a display and/or other input-output devices 56, and/or for powering other components). A single coil 48 or multiple coils 48 may be included in device 24.

As previously mentioned, in-band transmissions using coils 36 and 48 may be used to convey (e.g., transmit and receive) information between devices 12 and 24. With one illustrative configuration, frequency-shift keying (FSK) is used to transmit in-band data from device 12 to device 24 and amplitude-shift keying (ASK) is used to transmit in-band data from device 24 to device 12. In other words, a device transmitting wireless power may use FSK to transmit in-band data to a device receiving wireless power (regardless of whether either device is a dedicated power transmitting/receiving device 12/24 or a power receiving and transmitting device 18). A device receiving wireless power may use ASK to transmit in-band data to a device transmitting wireless power (regardless of whether either device is a dedicated power transmitting/receiving device 12/24 or a power receiving and transmitting device 18).

Power may be conveyed wirelessly from device 12 to device 24 during these FSK and ASK transmissions. While power transmitting circuitry 52 is driving AC signals into one or more of coils 36 to produce signals 44 at the power transmission frequency, wireless transceiver circuitry 40 may use FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 monitors the frequency of the AC signal passing through coil(s) 48 and uses FSK demodulation to extract the transmitted in-band data from signals 44. This approach allows FSK data (e.g., FSK data packets) to be transmitted in-band from device 12 to device 24 with coils 36 and 48 while power is simultaneously being wirelessly conveyed from device 12 to device 24 using coils 36 and 48.

In-band communications between device 24 and device 12 may use ASK modulation and demodulation techniques. Wireless transceiver circuitry 46 transmits in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 36. Wireless transceiver circuitry 40 monitors the amplitude of the AC signal passing through coil(s) 36 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 36 while power is simultaneously being wirelessly conveyed from device 12 to device 24 using coils 36 and 48.

The example of FSK modulation being used to convey in-band data from power transmitting device 12 to power receiving device 24 and ASK modulation being used to convey in-band data from power receiving device 24 to power transmitting device 12 is merely illustrative. In general, any desired communication techniques may be used to convey information from power transmitting device 12 to power receiving device 24 and from power receiving device 24 to power transmitting device 12.

The power transmission frequency used for transmission of wireless power may be, for example, a predetermined frequency of about 125 kHz, at least 80 kHz, at least 100 kHz, between 100 kHz and 205 kHz, less than 500 kHz, less than 300 kHz, or other suitable wireless power frequency. In some configurations, the power transmission frequency may be negotiated in communications between devices 12 and 24. In other configurations, the power transmission frequency may be fixed.

It has been described that power may be simultaneously conveyed between devices while using in-band communication for data transmission between the devices. In other words, in some examples in-band communications may rely on modulation of the power transmission signal (e.g., modulating the power transmission frequency or modulating amplitude of a signal at the power transmission frequency). However, other communication techniques may be used that do not rely on modulation of the power transmission signals. For example, signals (sometimes referred to as in-band signals) may be conveyed between coils in the system at a frequency that is different than the power transmission frequency. Signals (at the same frequency or a different frequency than the power transmission frequency) that are conveyed using the coils (e.g., coils 36, 48, and 90) may be considered in-band signals.

Moreover, it should be noted that in-band communication may occur between devices before the devices agree upon a power transfer rate, power transmission frequency, etc. After initial detection and inductive coupling, devices may go through a handshake process to determine compatibility, negotiate power transfer frequency, negotiate power transfer rate, etc. During this process, in-band communication may involve FSK and/or ASK modulation of signals transmitted using the coils. Therefore, wireless power is transmitted during this process. This is advantageous as it allows the devices to complete the handshake process even if the power receiving device has little or no remaining battery power. This transmission of wireless power during in-band communications may occur during the handshake process even if, ultimately, the negotiations between the devices result in no sustained transmission of wireless power.

Figure 3:
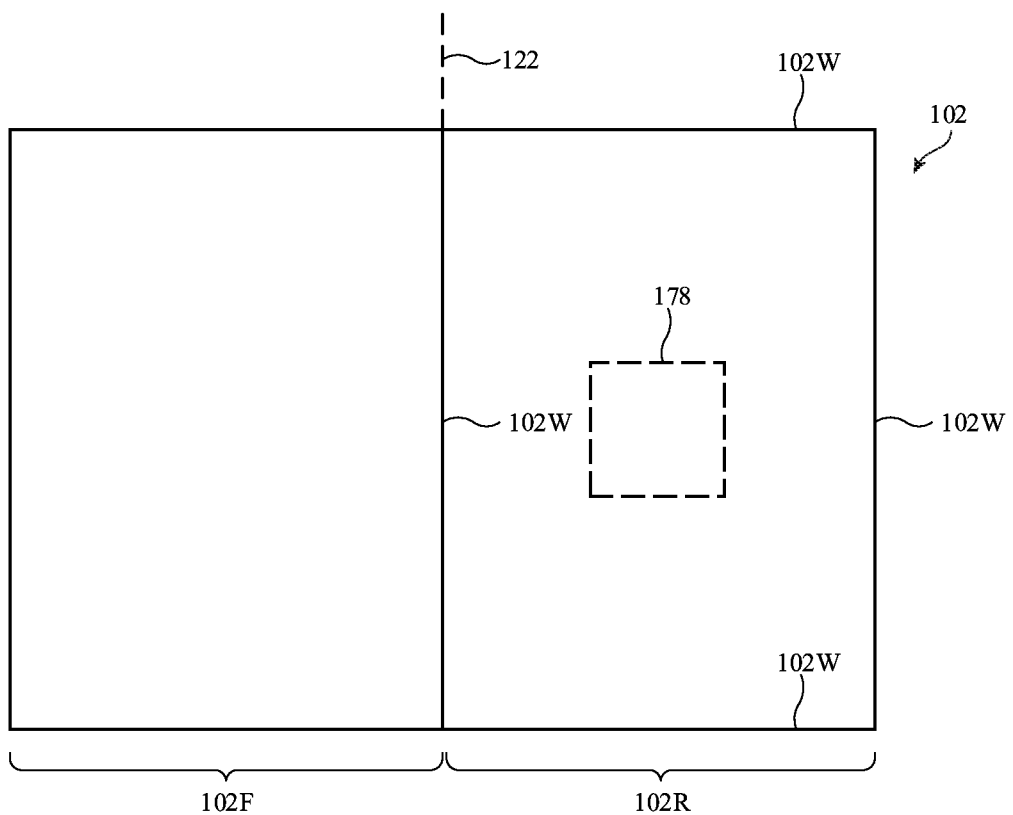
FIG. 3 is a top view of an illustrative removable case having a front cover portion in accordance with an embodiment.

A device in wireless charging system 8 may optionally be coupled to a removable accessory such as a case. The case may optionally have wireless charging functionality (e.g., the case may be capable of receiving and/or transmitting wireless power). FIG. 3 is a top view of an accessory such as a removable cover.

Removable accessory 102 (sometimes referred to as a removable case or removable cover) may have any suitable shape that allows cover 102 to mate with another device. Accessory 102 and the device to which it is coupled may each serve as a power transmitting device, a power receiving device, or a power transmitting and receiving device. The device held by accessory 102 may be a portable electronic device such as a wrist watch, a cellular telephone, a laptop computer, a tablet computer, an accessory such as an earbud, or other electronic equipment.

In the example of FIG. 3, cover 102 has a folio shape (sometimes referred to as a folio cover) with a rear portion 102R and front portion 102F. Rear portion 102R may have a rectangular recess with a rear wall surrounded by peripheral sidewalls 102W and/or other suitable coupling structures (straps, clips, a sleeve, corner pockets, etc.) that allow cover 102 to receive and couple to the additional device.

The portion of cover 102 that extends along fold axis 122 between rear portion 102R and front portion 102F may have hinge structures (e.g., flexible cover material that serves as a hinge or other hinge structures that couple portions 102F and 102R while allowing these portions to rotate relative to each other). In some configurations, additional bendable portions may be provided. For example, front portion 102F may have one or more flexible strips. Each flexible strip allows additional folds to be formed in cover 102 (e.g., to manipulate the cover into one or more stand configurations and prop the additional device at a desired angle while cover 102 is coupled to the additional device). Each flexible strip may extend parallel to fold axis 122 from one side of the front portion 102F to another side of front portion 102F.

When it is desired to protect the additional device in cover 102, the device (e.g., a housing of the device) may be press fit into a recess formed by the sidewalls 102W and/or rear wall of cover 102, coupled to cover 102 using magnets, clips, or straps, or otherwise coupled to cover 102. Cover 102 may be formed from fabric, leather, polymer, other materials, and/or combinations of these materials.

As previously mentioned, cover 102 may in some embodiments include a coil that transmits and/or receives wireless power. For example, cover 102 may be a wireless power receiving device (e.g., device 24 in FIG. 1) with a receiving coil 48 in region 178 on a rear portion 102R of the cover. The receiving coil 48 in region 178 may be aligned with a transmitting coil in the device coupled to accessory 102. When accessory 102 is coupled to the additional device, the additional device may transmit wireless power to the receiving coil in region 178 of cover 102.

Incorporating a wireless power receiving coil in the cover may allow for the cover to charge an internal battery, power components within the cover (e.g. input-output components such as a keyboard), and/or provide wireless power to additional accessories. For example, cover 102 may be configured to charge an electronic stylus (e.g., that may be used to provide input on a display in the additional device). In this type of arrangement, cover 102 may be a power transmitting and receiving device (e.g., device 18 in FIG. 1). Cover 102 may include a wireless power receiving coil in region 178 and a separate wireless power transmitting coil. The separate wireless power transmitting coil may optionally be positioned in a different portion of the cover than region 178 (e.g., in a region along fold axis 122, in one of sidewalls 102W, or another desired location within the cover).

Figure 4:
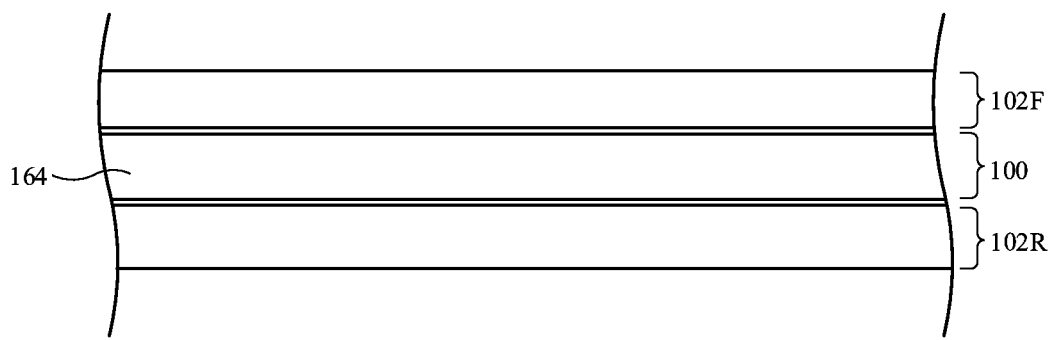
FIG. 4 is a cross-sectional side view of the illustrative removable case of FIG. 3 in accordance with an embodiment.

FIG. 4 is a cross-sectional side view showing device 100 held in removable cover 102. Device 100 may have a housing 164. Housing 164 may be formed of plastic, glass, ceramics, fiber composites, metal (e.g., stainless steel, aluminum, etc.), other suitable materials, or a combination of any two or more of these materials. In one illustrative example, device 100 is a power transmitting and receiving device (e.g., device 18 in FIG. 1). Device 102 may be a power receiving device (e.g., device 24 in FIG. 1) that receives wireless power from device 100. Alternatively, device 102 may also be a power transmitting and receiving device that receives wireless power from device 100 and transmits wireless power to an additional accessory device such as a stylus. In yet another possible configuration, device 102 may be capable of transmitting wireless power to device 100.

In FIG. 4, the front portion 102F of cover 102 is folded over and covers the front face of device 100. Accordingly, front portion 102F of cover 102 covers a display in device 100. This may protect the display from damage. As previously mentioned, cover 102 may include a wireless power receiving coil in rear portion 102R that is configured to receive wireless power from device 100. In other arrangements, device 100 may need to transmit and/or receive wireless charging signals through cover 102. For example, device 100 may be coupled to cover 102 and placed on a wireless charging mat. The wireless charging mat may transfer wireless power signals to the device 100 through cover 102. In this type of situation, it is desirable for the cover to not interfere with the wireless power transfer operations through the cover.

The example in FIGS. 3 and 4 of removable case 102 being a removable cover having a cover portion (102F) configured to fold over and cover the display of device 100 is merely illustrative. In some arrangements, the front cover portion 102F may be omitted from the removable case.

As an example, the removable case may include only a rear portion (e.g., configured to cover a rear housing wall of device 100, sometimes referred to as rear wall) and sidewalls (e.g., four peripheral sidewalls that extend from the rear wall). The sidewalls (e.g., sidewalls 102W in FIG. 3) may extend perpendicular to the rear portion of the removable case. The sidewalls may form a recess that is configured to receive and secure device 100 within the removable case. When it is desired to protect device 100 in the removable case, device 100 (e.g., housing 164 of device 100) may be press fit into a recess formed by the sidewalls of the removable case, coupled to the removable case using magnets, clips, or straps, or otherwise coupled to the removable case. The removable case (that does not include a front cover portion) may be formed from fabric, leather, polymer, metal other materials, and/or combinations of these materials.

In general, wireless power signals may be conveyed to or from various portions of case 102. Wireless power signals may also be conveyed through case 102 at any desired locations. In one example, case 102 may be a power transmitting and receiving device that includes a power receiving coil in a rear wall. Case 102 may also include a power transmitting coil in another desired region (e.g., a peripheral sidewall). This example is merely illustrative, and other arrangements for conveying wireless power to, from, or through case 102 may be used if desired.

The wireless power circuitry in each device in the wireless charging system may be designed to accommodate a number of different charging scenarios. In one scenario, shown in FIG. 4, an electronic device such as a tablet computer or cellular telephone (e.g., device 100) is coupled to a removable accessory. The electronic device may transmit wireless power to the removable accessory in this scenario (e.g., so that the removable accessory can in turn provide power to a stylus, power internal components, etc.).

Figure 5:
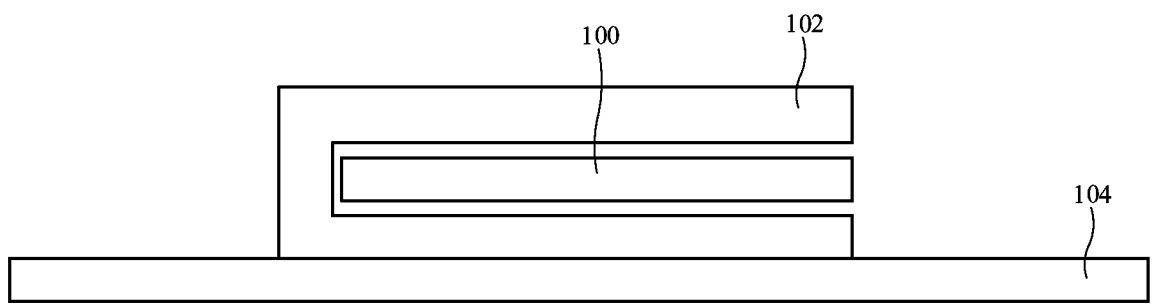
FIG. 5 is a perspective view of an illustrative wireless charging system with a portable electronic device and a removable accessory on the charging surface of a wireless power transmitting device in accordance with an embodiment.

In another scenario, device 100 may be placed on a power transmitting device (without the removable accessory being present). In yet another scenario, shown in FIG. 5, device 100 may be both coupled to removable accessory 102 and placed on a power transmitting device. In this scenario, power transmitting device 104 may transmit wireless power to device 100 through accessory 102 and/or to accessory 102 itself.

Similar to as discussed in connection with FIG. 1, the power transmitting device 104 may be a wireless charging mat, wireless charging puck, a battery case (e.g., a dedicated wireless power transmitting device), or another electronic device (e.g., a wireless power transmitting and receiving device). An example is described herein where the power transmitting device 104 is a wireless charging mat. The wireless charging mat 104 may be coupled to a wall outlet (e.g., an alternating current power source). Using power from this power source, the wireless charging mat 104 may transmit wireless power to one or more devices.

Figure 6:
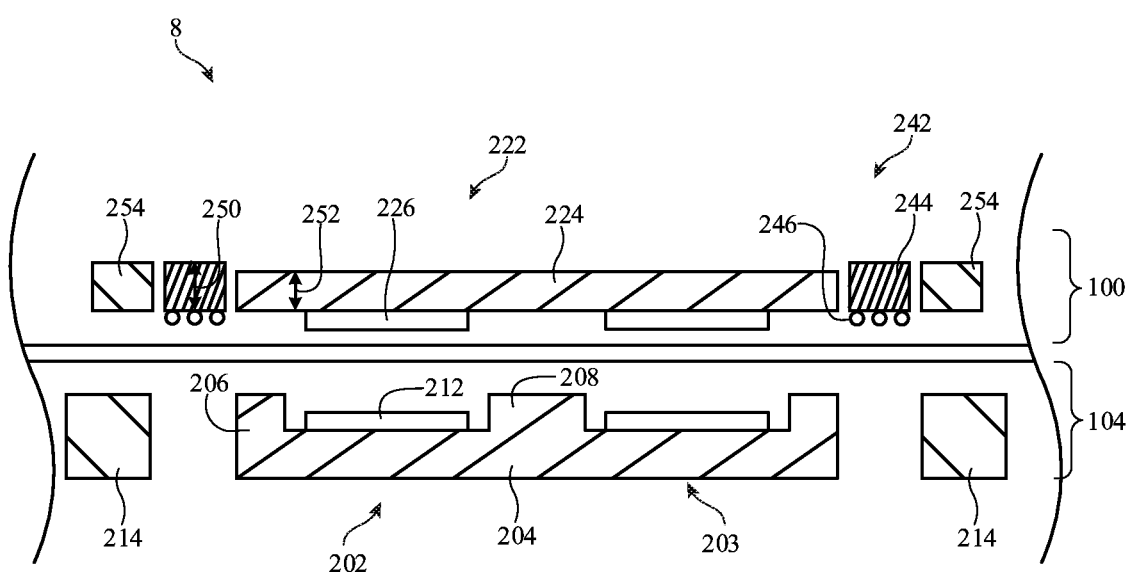
FIG. 6 is a cross-sectional side view of an illustrative wireless charging system with a portable electronic device on the charging surface of a wireless power transmitting device in accordance with an embodiment.
Figure 7:
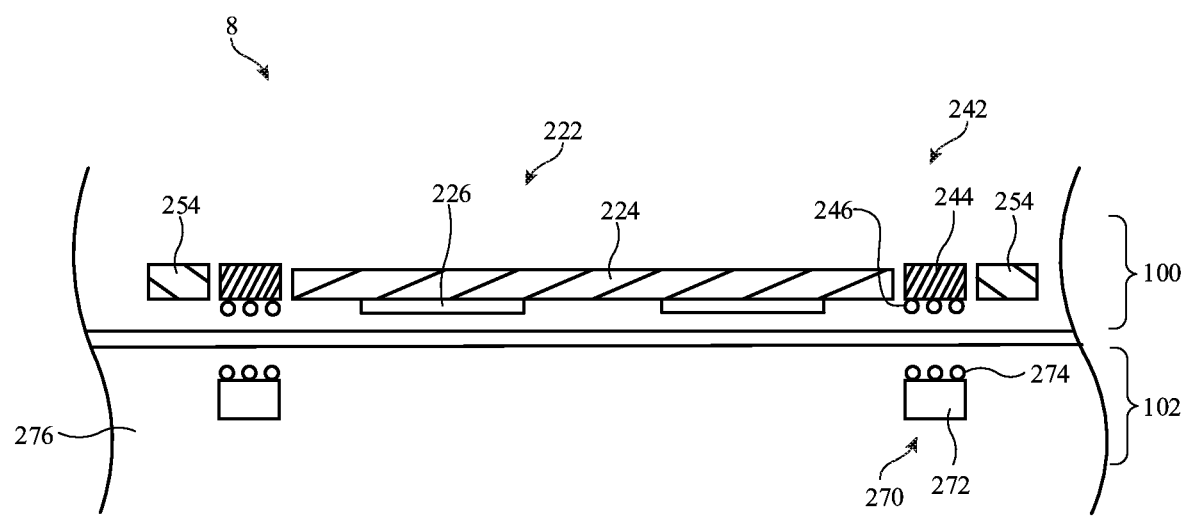
FIG. 7 is a cross-sectional side view of an illustrative wireless charging system with a portable electronic device coupled to a removable accessory in accordance with an embodiment.
Figure 8:
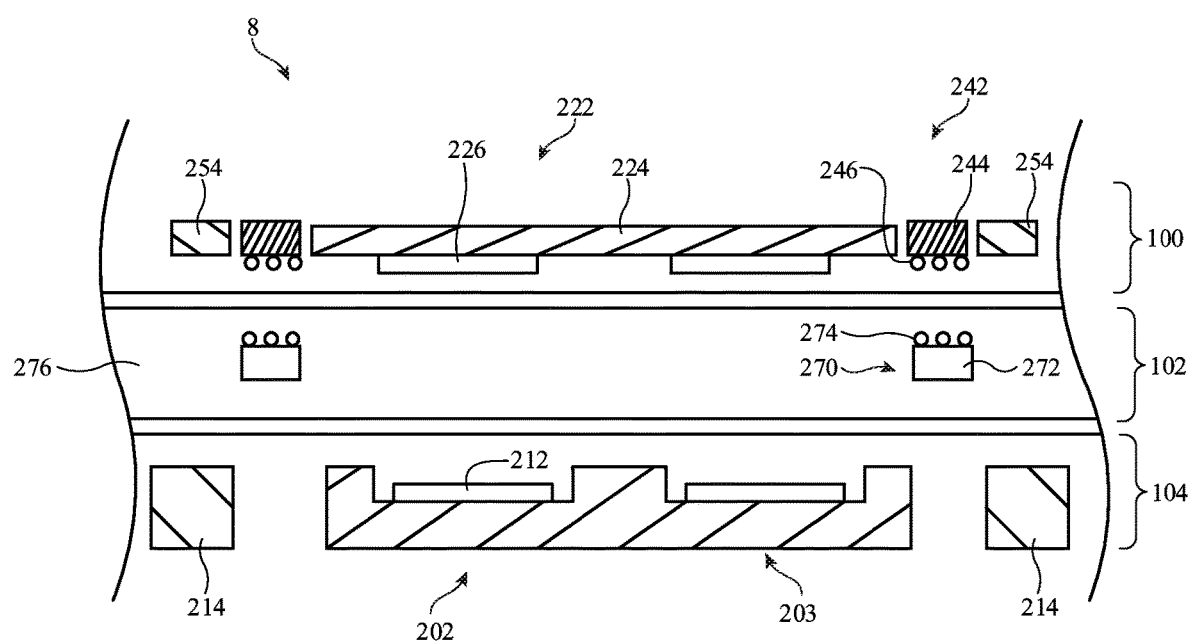
FIG. 8 is a cross-sectional side view of an illustrative wireless charging system with a portable electronic device and a removable accessory on the charging surface of a wireless power transmitting device in accordance with an embodiment.

FIGS. 6-8 are cross-sectional side views showing the wireless charging system in some of these scenarios. FIG. 6 is a cross-sectional side view of a portable electronic device 100 (e.g., a wrist watch, a cellular telephone, a laptop computer, a tablet computer, an accessory such as an earbud, or other electronic equipment) on the surface of a wireless charging mat 104. Device 100 may be a wireless power transmitting and receiving device (e.g., device 18 in FIG. 1) whereas device 104 is a wireless power transmitting device (e.g., device 12 in FIG. 1).

As shown, a power transmitting assembly 202 (e.g., part of power transmitting circuitry 52) is included within wireless power transmitting device 104. The power transmitting assembly (sometimes referred to as an inductive power transmitting assembly) includes a magnetic core 203 having a base 204, a first limb 206, and a second limb 208. A coil 212 is positioned on the magnetic core (e.g., between limbs 208 and 206). Limb 206 may have a ring-shape that is concentric with coil 212, as one example. Coil 212 may be coupled to inverter circuitry (e.g., inverter 61 in FIG. 1). The inverter circuitry can drive the coil 212 to generate magnetic flux. Coil 212 may be wound from a single-strand conductor, a multiple strand conductor having multiple wires connected in parallel, braided wire, Litz wire, a conductive ink or conductive trace such as multilayer tracks on a printed circuit board, or other conductive elements suitable for forming coils.

A power receiving assembly 222 is included within device 100. As previously mentioned, device 100 may be a power transmitting and receiving device 18 as in FIG. 1 (and power receiving assembly 222 may be part of wireless power circuitry 84 in FIG. 1). The power receiving assembly (sometimes referred to as an inductive power receiving assembly) includes a magnetic core 224. A coil 226 is formed on the magnetic core. Coil 226 may be coupled to rectifier circuitry (e.g., rectifier 88 in FIG. 1). The rectifier circuitry converts received AC signals from coil 226 into DC voltage signals for powering device 100. Coil 226 may be wound from a single-strand conductor, a multiple strand conductor having multiple wires connected in parallel, braided wire, Litz wire, a conductive ink or conductive trace such as multilayer tracks on a printed circuit board, or other conductive elements suitable for forming coils.

Alignment structures such as magnetic alignment structures 214 and 254 may optionally be included in the system. As shown in FIG. 6, wireless power transmitting device 104 may have magnetic alignment structures 214. Wireless power transmitting and receiving device 100 may have magnetic alignment structures 254. Each magnetic alignment structure 214 in the transmitting device may magnetically couple with a corresponding magnetic alignment structure 254 in the receiving device. When the alignment structures 214 in device 104 are coupled to the alignment structures 254 in device 100, the transmitting coil 212 may be aligned with the receiving coil 226. Therefore, the magnetic alignment structures ensure proper alignment of the receiving coil relative to the transmitting coil. Magnetic alignment structures 214 and 254 may be permanent magnets (e.g., formed from hard magnetic materials that retain their magnetism over time).

Device 100 may also include a power transmitting assembly 242. The power transmitting assembly (sometimes referred to as an inductive power transmitting assembly) includes a magnetic core 244. A coil 246 is formed on the magnetic core. Coil 246 may be coupled to inverter circuitry (e.g., inverter 86 in FIG. 1). The inverter circuitry can drive the coil 246 to generate magnetic flux. Coils 246 and 226 may be coplanar and/or magnetic cores 244 and 224 may be coplanar. Coil 246 may be wound from a single-strand conductor, a multiple strand conductor having multiple wires connected in parallel, braided wire, Litz wire, a conductive ink or conductive trace such as multilayer tracks on a printed circuit board, or other conductive elements suitable for forming coils.

When device 100 is placed on charging mat 104 in the absence of removable accessory 102, transmitting assembly 242 may be disabled (e.g., wireless power is not transmitted using coil 246 and device 100 only receives wireless power using coil 226). However, when device 100 is coupled to accessory 102 in the absence of charging mat 104, receiving assembly 222 may be disabled (e.g., wireless power is not received using coil 226 and device 100 only transmits wireless power using coil 246).

The magnetic cores in FIG. 6 (e.g., 203, 224, and 244) may be formed from a soft magnetic material such as ferrite. The magnetic cores may have a high magnetic permeability, allowing them to guide the magnetic fields in the system. The example of using ferrite cores is merely illustrative. Other ferromagnetic and/or ferrimagnetic materials such as iron, mild steel, mu-metal (a nickel-iron alloy), a nanocrystalline magnetic material, rare earth metals, or other magnetic materials having a sufficiently high magnetic permeability to guide magnetic fields in the system may be used for one or more of the cores if desired. The magnetic cores may sometimes be referred to as ferrimagnetic cores. Magnetic cores 203, 224, and 244, may be a single piece or made from separate pieces. The cores may be molded, sintered, formed from laminations, formed from particles (e.g., ceramic particles) distributed in a polymer, or manufactured by other processes.

Magnetic cores 203 and 224 may improve coupling between coils 212 and 226 (compared to an arrangement where cores 203 and 224 are omitted). Magnetic core 224 in FIG. 6 may redirect received magnetic flux to coil 226. Magnetic core 224 may have a disc shape or other desired shape.

Each core may be optimized for its particular function and position within the wireless charging system. Different devices may have different space constraints that result in the cores being formed from different materials and/or having different geometries. In one illustrative example, coil 226 may be operable at a higher maximum power level than coil 246. In other words, coil 226 may be configured to receive wireless power at a first maximum power level. Coil 246 is configured to transmit wireless power at a second maximum power level that is lower than the first maximum power level. In one example, the maximum power level for coil 226 may be 10 Watts or greater whereas the maximum power level for coil 246 may be less than 10 Watts. In one example, coil 226 can receive at up to 15 Watts and coil 246 can transmit at up to 5 Watts. These magnitudes for the maximum power levels are merely illustrative. In general, each coil may operate any desired power level.

Due to the different associated geometries and power levels, magnetic core 244 may have one or more properties that are different than the properties of magnetic core 224. For example, core 244 may be formed from a different material than core 224 (e.g., a material having a different magnetic permeability). Cores 244 and 224 may have different thicknesses. As shown, core 244 has a thickness 250 whereas core 224 has a thickness 252. Thickness 250 may be greater than thickness 252, in one example. Cores 244 and 224 may have different magnetic permeabilities, different magnetic reluctances, or other desired different properties. Cores 244 and 224 may also have different saturation flux densities.

FIG. 7 is a cross-sectional side view of a portable electronic device 100 coupled to removable accessory 102 (e.g., device 100 may be pressed into accessory 102 as shown in FIG. 3). Accessory 102 may include a power receiving assembly 270 that includes a coil 274 for receiving wireless power from device 100 and switchable magnetic core 272. Power receiving assembly 270 in accessory 102 may be optimized for different charging scenarios. When accessory 102 is coupled to device 100 in the absence of power transmitter 104 (as in FIG. 7), it is desirable for device 100 to efficiently transfer wireless power to cover 102. However, when accessory is coupled to device 100 and placed on power transmitter 104 (as in FIG. 8), it is desirable for accessory 102 to not disrupt the power transfer from device 104 to device 100.

To ensure satisfactory operation of the wireless charging system in both of these charging scenarios, accessory 102 may include a switchable magnetic core. In the absence of the transmitting device 104, the switchable magnetic core may have a high magnetic permeability and therefore low magnetic reluctance. In the presence of the transmitting device 104, the switchable magnetic core may have a low magnetic permeability and therefore high magnetic reluctance. This may be achieved by selecting a material for magnetic core 272 with a low saturation flux density.

When transmitting device 104 is not present, as shown in FIG. 7, switchable magnetic core 272 (sometimes referred to as switchable ferrimagnetic core 272) is not exposed to a significant external magnetic field. Therefore, switchable core 272 does not reach its saturation flux density and maintains a high magnetic permeability and low magnetic reluctance. In this state, switchable core 272 serves as a magnetic core that guides the magnetic fields in the system. In other words, in FIG. 7 coil 274 is inductively coupled to coil 246 and magnetic core 272 redirect received magnetic flux to coil 274.

When transmitting device 104 is present, as shown in FIG. 8, switchable magnetic core 272 is exposed to the external magnetic field of magnetic alignment structures 214 (which may include one or more permanent magnets). The magnetic field from the magnetic alignment structures 214 may be sufficiently high to saturate switchable magnetic core 272. Once saturated, the magnetic permeability of switchable core 272 declines and the magnetic reluctance of the switchable core increases. Due to the drop in magnetic permeability and increase in magnetic reluctance, the magnetic core does not guide the magnetic fields in the system. Effectively, saturating the switchable magnetic core 272 using permanent magnet 214 turns 'off' magnetic core 272. This prevents switchable core 272 from undesirably redirecting magnetic flux passing through the accessory between coil 212 and coil 226.

In FIG. 8, when accessory 102 is interposed between device 104 and device 100, device 104 may transfer wireless power through cover 102 to device 100. Similar to as when cover 102 is not present, coils 226 and 212 are inductively coupled. Magnetic core 224 in device 100 redirects received magnetic flux to coil 226.

When accessory 102 is interposed between device 104 and device 100 as in FIG. 8, the transmitting assembly in device 100 may be disabled. In other words, coils 246 and 274 are not inductively coupled in FIG. 8. Because coils 246 and 274 are not inductively coupled, switchable core 272 being saturated does not adversely affects the charging efficiency between coils 246 and 274. Additionally, switchable core 272 being saturated ensures that the inductive coupling between coils 212 and 226 is uninterrupted by the switchable core. Coils 212 and 226 may operate at a higher maximum power level than coil 274. Therefore, efficient power transfer between these coils is prioritized by saturating magnetic core 272 when transmitting device 104 is present.

When removable accessory 102 is placed on charging mat 104 (as in FIG. 8), coil 274 may also be inductively coupled to coil 212 in device 104. Power transfer levels between coils 212 and 274 may be lower than between coils 212 and 226. This example is merely illustrative. In another possible embodiment, coils 274 may not be inductively coupled to coil 212 in an arrangement of the type shown in FIG. 8.

Coil 274 may be wound from a single-strand conductor, a multiple strand conductor having multiple wires connected in parallel, braided wire, Litz wire, a conductive ink or conductive trace such as multilayer tracks on a printed circuit board, or other conductive elements suitable for forming coils.

Switchable magnetic core 272 in FIGS. 7 and 8 may be formed from a soft magnetic material such as ferrite. The example of using a ferrite core is merely illustrative. Other ferromagnetic and/or ferrimagnetic materials such as iron, mild steel, mu-metal (a nickel-iron alloy), a nanocrystalline magnetic material, rare earth metals, or other magnetic materials having a sufficiently high magnetic permeability to guide magnetic fields in the system may be used for the core. The magnetic core may sometimes be referred to as a switchable ferrimagnetic core. Magnetic core 272 may be a single piece or made from separate pieces. The core may be molded, sintered, formed from laminations, formed from particles (e.g., ceramic particles) distributed in a polymer, or manufactured by other processes.

Magnetic core 272 may reach saturation at less than 2 teslas (T), less than 1.5 T, less than 1.0 T, less than 0.8 T, less than 0.5 T, less than 0.3 T, less than 0.2 T, less than 0.1 T, etc. Magnetic cores 224, 203, and/or 244 may reach saturation at a greater point than core 272.

Magnetic alignment structures 214 and 254 may be magnetically coupled even when accessory 102 is present between devices 100 and 104.

Figure 9:
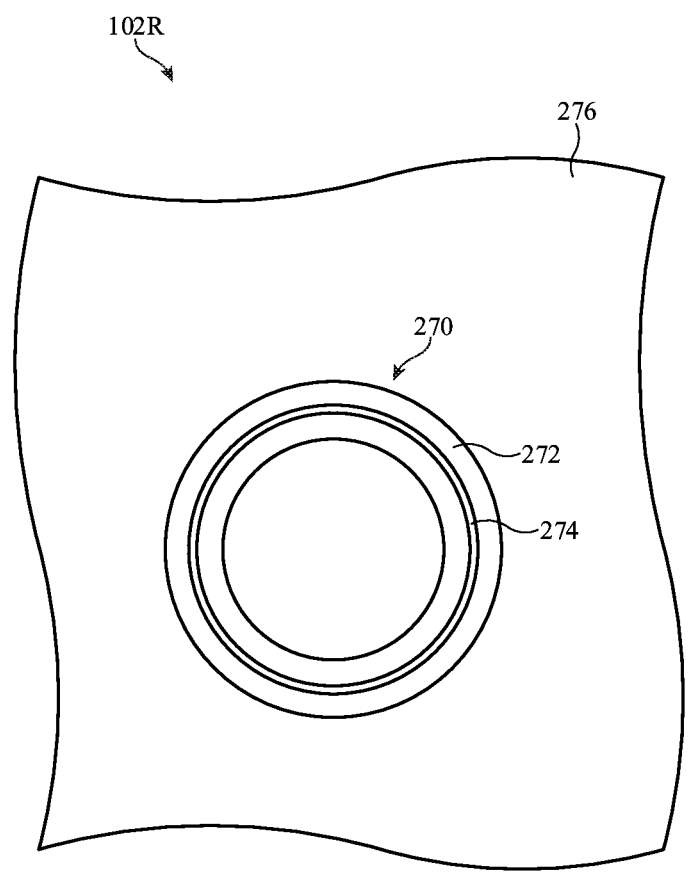
FIG. 9 is a top view of a rear portion of an illustrative removable accessory having a ring-shaped switchable ferrimagnetic core in accordance with an embodiment.

FIG. 9 is a top view of the rear portion 102R of an illustrative removable accessory. As shown, the power receiving assembly 270 in FIG. 9 includes a ring-shaped switchable magnetic core 272. One or more coils 274 are formed over the magnetic core 272. The ring-shaped switchable magnetic core 272 and coil 274 may be embedded in a dielectric material for the accessory such as dielectric material 276 (also shown in FIGS. 7 and 8). Coil 274 and core 272 may be entirely surrounded by and in direct contact with dielectric material 276 (e.g., fabric, leather, polymer, and/or other materials). This example is merely illustrative. In an alternate arrangement, core 272 and coil 274 may be laterally surrounded by dielectric material 276 and may have one or more exposed surfaces on the upper/lower surfaces of rear portion 102R. The core 272 and coil 274 may be concentric rings.

Power received using power receiving assembly 270 may be used to charge a battery in case 102, power additional components in case 102 (e.g., additional input-output components), and/or provide wireless power to an additional accessory. As previously discussed, case 102 may optionally include a power transmitting assembly elsewhere within the accessory (e.g., in a sidewall) that transmits wireless power to an accessory such as an electronic stylus. In embodiments where accessory 102 includes a front portion 102F that is coupled to rear portion 102R, the optional additional power transmitting assembly may be formed at the flexible hinge structures between the front portion 102F and the rear portion 102R.

Figure 10:
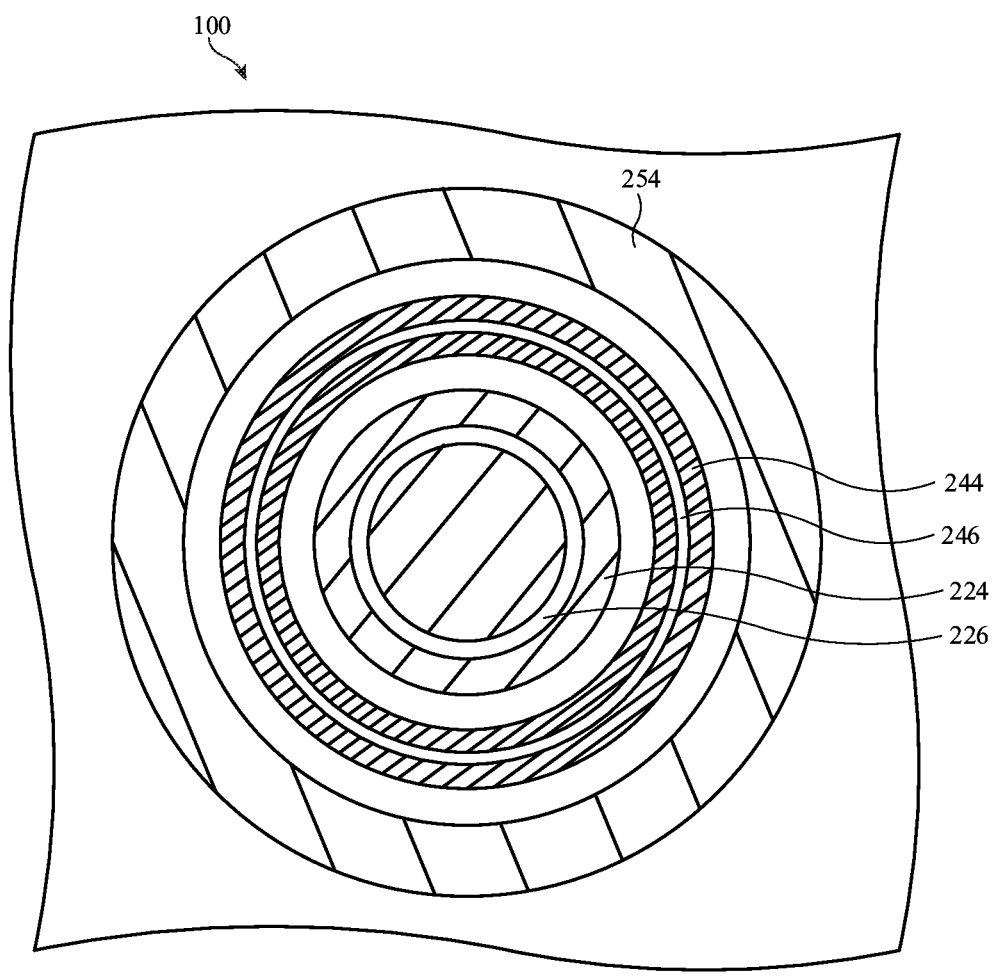
FIG. 10 is a top view of an illustrative portable electronic device with a transmitting coil having a central opening and a receiving coil within the central opening in accordance with an embodiment.

FIG. 10 is a top view of an illustrative portable electronic device having a power receiving assembly and power transmitting assembly such as device 100 in FIGS. 6-8. As shown, device 100 includes one or more coils 226 that overlap magnetic core 224. Magnetic core 224 has a circular shape and may be referred to as disc-shaped or circular. Magnetic core 224 and coil 226 are used to form a power receiving assembly 222 as shown in FIGS. 6-8. Device 100 also includes a power transmitting assembly with one or more coils 246 overlapping magnetic core 244. Coil 246 and core 244 may be ring-shaped. The ring-shaped coil 246 and core 244 have a central opening, with core 224 and coil 226 formed in the central opening.

A ring-shaped magnetic alignment structure 254 (e.g., permanent magnet) may laterally surround core 244. Alignment structure 254 may have a central opening, with core 224, coil 226, core 244, and coil 246 formed in the central opening. In FIG. 10, therefore, coil 226, coil 246, magnetic core 244, and alignment structure 254 are concentric rings. This example is merely illustrative. Other arrangements may be used if desired (e.g., alignment structure 254 may be formed as two discrete permanent magnets on opposing sides of core 244).

The example of power transmitting assemblies and power receiving assemblies shown in FIGS. 6-10 are merely illustrative. In general, the power transmitting assembly and power receiving assembly may have any desired design. In one possible arrangement, the magnetic core of the power transmitting assembly and/or power receiving assembly may have a pot-core design (e.g., an enclosure with a ring-shaped hollow portion that receives the coil). In yet another possible arrangement, the power transmitting assembly and/or power receiving assembly may include a winding on a bar-shaped ferrite. Any desired magnetic core and coil design may be used (e.g., a U-shaped core, a C-shaped core, an E-shaped core, a toroidal core, etc.).

In general, each transmitting/receiving assembly may have only one coil, two coils, three coils, more than three coils, etc. Each coil may have any desired number of windings. Each assembly may optionally include a transverse coil (e.g., a coil extending along the magnetic core base between two magnetic core limbs). The precise geometry of the coils and magnetic cores in devices 100, 102, and 104 may be tailored to the specific design. Device 100 may be designed to cooperate specifically with wireless power transmitting device 104. This is, however, merely illustrative. Device 100 may, in comes cases, not be specifically designed to cooperate with power transmitting device 104. In general, each device may have different coil arrangements, different (or no) magnetic elements (e.g., magnetic cores), different coil and magnetic element sizes, different coil and magnetic element shapes, and other different characteristics.

The foregoing is merely illustrative and various modifications can be made to the described embodiments. The foregoing embodiments may be implemented individually or in any combination.

What is claimed is:

1. An electronic device comprising:
   a first planar wireless charging coil having windings wound about a central region, wherein the first planar wireless charging coil is configured to transmit first wireless power signals;
   a second planar wireless charging coil having windings positioned in the central region, wherein the second planar wireless charging coil is configured to receive second wireless power signals;
   a first ferrimagnetic core overlapping the first planar wireless charging coil; and
   a second ferrimagnetic core overlapping the second planar wireless charging coil, the second ferrimagnetic core positioned to direct received magnetic flux towards the second planar wireless charging coil, wherein the second ferrimagnetic core has a different magnetic reluctance than the first ferrimagnetic core.

2. The electronic device of claim 1, wherein the first planar wireless charging coil is configured to operate at a first maximum power level and wherein the second planar wireless charging coil is configured to operate at a second maximum power level that is greater than the first maximum power level.

3. The electronic device of claim 1, wherein the first planar wireless charging coil is configured to cease transmission of the first wireless power signals when the second planar wireless charging coil receives the second wireless power signals.

4. The electronic device of claim 1, wherein the first planar wireless charging coil is configured to transmit the first wireless power signals when the electronic device is coupled to a removable accessory.

5. The electronic device of claim 1, wherein the second planar wireless charging coil is configured to receive the second wireless power signals when the electronic device is coupled to a wireless power transmitting device.

6. The electronic device of claim 1, wherein the second planar wireless charging coil is configured to receive the second wireless power signals when the electronic device is coupled to a removable accessory and a wireless power transmitting device.

7. The electronic device of claim 1, wherein the first planar wireless charging coil and the second planar wireless charging coil are coplanar.

8. The electronic device of claim 1, wherein the first ferrimagnetic core and the second ferrimagnetic core are coplanar.

9. The electronic device of claim 1, wherein the first ferrimagnetic core and the second ferrimagnetic core are formed from different materials.

10. The electronic device of claim 1, wherein the first ferrimagnetic core and the second ferrimagnetic core have different thicknesses.

11. An electronic device comprising:
- a first planar wireless charging coil having windings wound about a central region;
- a second planar wireless charging coil having windings positioned in the central region;
- a first ferrimagnetic core overlapping the first planar wireless charging coil;
- a second ferrimagnetic core overlapping the second planar wireless charging coil, the second ferrimagnetic core positioned to direct received magnetic flux towards the second planar wireless charging coil, wherein the second ferrimagnetic core has a different magnetic reluctance than the first ferrimagnetic core; and
- a ring-shaped permanent magnet having a central opening, wherein the first planar wireless charging coil and the second planar wireless charging coil are positioned in the central opening of the ring-shaped permanent magnet.

12. The electronic device of claim 1, wherein the second planar wireless charging coil is configured to receive the second wireless power signals from a wireless power transmitting device when the electronic device and a removable accessory are inductively coupled to the wireless power transmitting device and a ferrimagnetic core in the removable accessory is in a first state.

13. The electronic device defined in claim 12, wherein the first planar wireless charging coil is configured to transmit the first wireless power signals to a wireless power receiving coil in the removable accessory when the electronic device and the removable accessory are not inductively coupled to the wireless power transmitting device and the ferrimagnetic core is in a second state that is different than the first state.

14. The electronic device of claim 11, wherein the first planar wireless charging coil is configured to operate at a first maximum power level and wherein the second planar wireless charging coil is configured to operate at a second maximum power level that is greater than the first maximum power level.

15. The electronic device of claim 11, wherein the first planar wireless charging coil is configured to transmit first wireless power signals and wherein the second planar wireless charging coil is configured to receive second wireless power signals.

16. The electronic device of claim 11, wherein the first planar wireless charging coil and the second planar wireless charging coil are coplanar.

17. The electronic device of claim 11, wherein the first ferrimagnetic core and the second ferrimagnetic core are formed from different materials.

18. The electronic device of claim 11, wherein the first ferrimagnetic core and the second ferrimagnetic core have different thicknesses.

19. The electronic device of claim 11, wherein the second planar wireless charging coil is configured to receive the second wireless power signals from a wireless power transmitting device when the electronic device and a removable accessory are inductively coupled to the wireless power transmitting device and a ferrimagnetic core in the removable accessory is in a first state and wherein the first planar wireless charging coil is configured to transmit the first wireless power signals to a wireless power receiving coil in the removable accessory when the electronic device and the removable accessory are not inductively coupled to the wireless power transmitting device and the ferrimagnetic core is in a second state that is different than the first state.

* * * * *